United States Patent
Hamada et al.

(10) Patent No.: US 9,448,641 B2
(45) Date of Patent: Sep. 20, 2016

(54) GESTURE INPUT APPARATUS

(71) Applicant: DENSO CORPORATION, Kariya, Aichi-pref. (JP)

(72) Inventors: Koji Hamada, Kariya (JP); Tetsuya Tomaru, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/709,584

(22) Filed: May 12, 2015

(65) Prior Publication Data
US 2015/0338922 A1 Nov. 26, 2015

(30) Foreign Application Priority Data

May 21, 2014 (JP) ................................. 2014-105558

(51) Int. Cl.
| | | |
|---|---|---|
| G06F 3/00 | (2006.01) | |
| G06F 3/01 | (2006.01) | |
| B60K 35/00 | (2006.01) | |
| G01C 21/26 | (2006.01) | |
| H04N 5/232 | (2006.01) | |
| G06K 9/00 | (2006.01) | |
| G06F 3/03 | (2006.01) | |

(52) U.S. Cl.
CPC ............... G06F 3/017 (2013.01); B60K 35/00 (2013.01); G01C 21/26 (2013.01); G06F 3/0304 (2013.01); G06K 9/00355 (2013.01); G06K 9/00832 (2013.01); H04N 5/23229 (2013.01); B60K 2350/1052 (2013.01)

(58) Field of Classification Search
CPC combination set(s) only.
See application file for complete search history.

(56) References Cited

U.S. PATENT DOCUMENTS

| | | | |
|---|---|---|---|
| 2008/0144779 A1* | 6/2008 | Ray | H04L 12/66 379/45 |
| 2011/0037725 A1* | 2/2011 | Pryor | G01C 21/3664 345/174 |
| 2011/0050589 A1* | 3/2011 | Yan | B60K 37/06 345/173 |
| 2013/0009900 A1* | 1/2013 | Pryor | B60K 35/00 345/173 |
| 2013/0321261 A1 | 12/2013 | Nakasu et al. | |
| 2013/0328761 A1* | 12/2013 | Boulanger | G06F 3/017 345/156 |
| 2014/0172231 A1* | 6/2014 | Terada | G06F 3/005 701/36 |
| 2015/0022664 A1* | 1/2015 | Pflug | H04N 7/181 348/148 |

FOREIGN PATENT DOCUMENTS

| | | |
|---|---|---|
| JP | 2013-218391 A | 10/2012 |
| JP | 2013-242889 A | 12/2013 |
| JP | 2014-085964 A | 5/2014 |

\* cited by examiner

*Primary Examiner* — Yonel Beaulieu
(74) *Attorney, Agent, or Firm* — Posz Law Group, PLC

(57) ABSTRACT

A gesture input apparatus that includes a command determination portion provided in a vehicle and determining a command according to a gesture of a first region in an upper limb of an operator who rides on the vehicle, a command output portion outputting the command determined by the command determination portion, a speed detection portion detecting a movement speed of a second region that is positioned nearer to a shoulder of the operator than the first region in the upper limb, and an output prohibition portion prohibiting an output of the command by the command output portion when the movement speed detected by the speed detection portion is equal to or more than a predetermined speed is provided.

16 Claims, 7 Drawing Sheets

GESTURE INPUT APPARATUS

CROSS REFERENCE TO RELATED APPLICATION

This application is based on Japanese Patent Application No. 2014-105558 filed on May 21, 2014, the disclosure of which is incorporated herein by reference.

TECHNICAL FIELD

The present disclosure relates to a gesture input apparatus outputting a command according to a gesture of an upper limb of an operator riding on a vehicle.

BACKGROUND

Patent literature 1: JP 2013-218391A

Patent literature 1 discloses a gesture input apparatus for a vehicle that detects a gesture of a finger of an operator who rides on a vehicle and outputs a command according to the detected gesture. Specifically, the gesture input apparatus for a vehicle recognizes and outputs various commands, according to a movement of a finger captured by a camera, for operating onboard devices such as a navigation device.

The inventors of the present disclosure have found the following. It may be difficult to distinguish between a movement (a gesture) of a finger performed by an input purpose to an input device and another movement of the finger other than the input purpose. Therefore, another movement of the finger may be recognized as the gesture when an operator moves his/her finger irrespective of the input purpose. A command against an intention of the operator may be output.

SUMMARY

It is an object of the present disclosure to provide a gesture input apparatus suppressing an output of a command against an intention of an operator.

According to one aspect of the present disclosure, a gesture input apparatus is provided. The gesture input apparatus includes a command determination portion provided in a vehicle and determining a command according to a gesture of a first region in an upper limb of an operator who rides on the vehicle, a command output portion outputting the command determined by the command determination portion, a speed detection portion detecting a movement speed of a second region that is positioned nearer to a shoulder of the operator than the first region in the upper limb, and an output prohibition portion prohibiting an output of the command by the command output portion when the movement speed detected by the speed detection portion is equal to or more than a predetermined speed.

According to the gesture input apparatus, when the movement speed of the second region is equal to or more than a predetermined speed, an output of the command according to the gesture of the first region is prohibited. When the whole upper limb moves with the first region in a case other than the input purpose, the movement speed of the second region is equal to or more than the predetermined speed and the command output is prohibited. When the first region is moved around the predetermined region as the supporting point for performing the gesture input, the movement speed of the second region is less than the predetermined speed, and the command according to the gesture is output. According to the gesture input apparatus, it may be possible to prevent the command output against an intention of an operator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
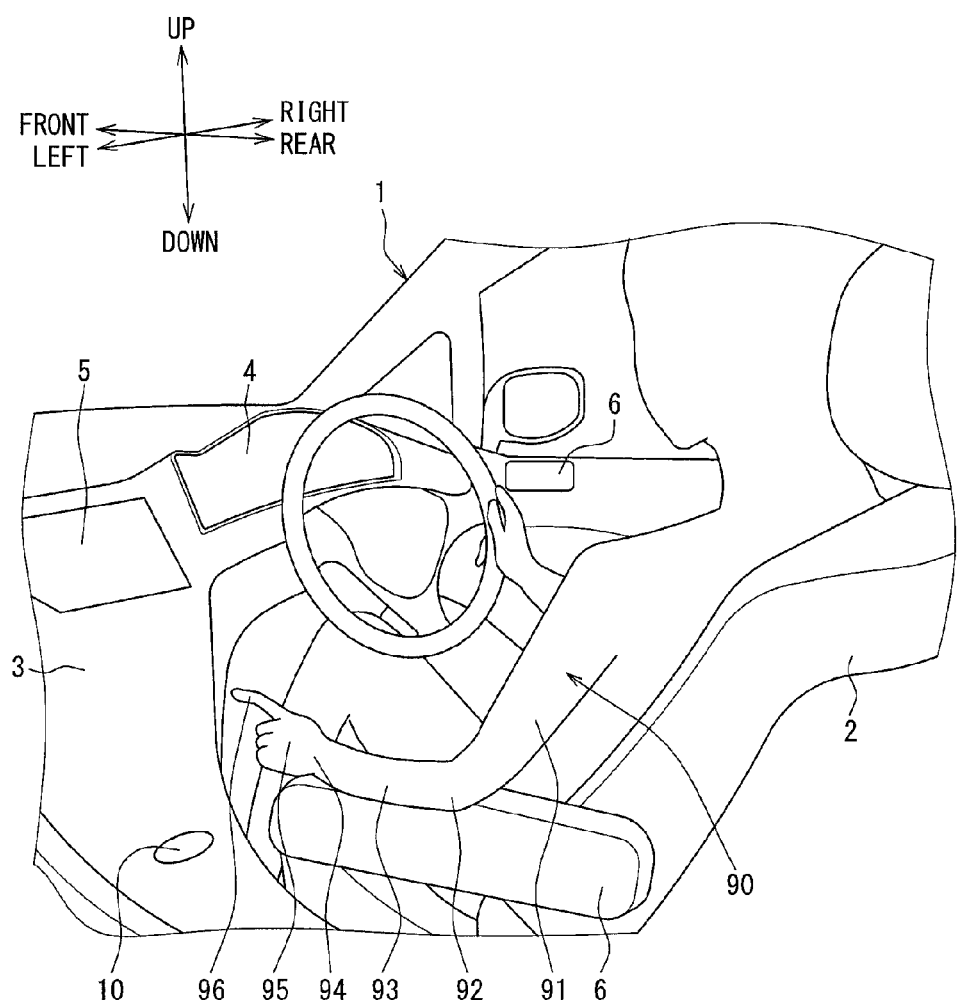
FIG. 1 is an oblique diagram illustrating a layout of a vehicle compartment mounting with a gesture input apparatus according to the present disclosure.

Embodiments of the present disclosure will be explained with referring to the drawings. In each embodiment, a segment corresponding to a matter explained in a precedent embodiment will have an identical symbol, and an explanation of the corresponding segment will be omitted. In each embodiment, when only a configuration is explained partially, an explanation of the other part of the configuration will be omitted by referring to an explanation in a precedent embodiment.

First Embodiment

A vehicle 1 in FIG. 1 corresponds to a right side steering wheel designed vehicle in which a driving seat 2 is provided in a right side in a right-and-left direction of the vehicle. The right-and-left direction of the vehicle may be referred to as a lateral direction. An up-and-down direction may be referred to as a vertical direction. Arrows in FIG. 1 illustrate an up-and-down direction, a front-and-rear direction, and a right-and-left direction to the vehicle 1. A meter device 4 displaying vehicle speed or the like is provided at a position corresponding to the front of the driving seat 2 in an instrument panel 3. The instrument panel 3 is provided in a vehicle compartment. A central portion in the instrument panel 3 in the right-and-left direction of the vehicle includes a display device 5. The display device 5 displays map information included in a navigation device, configuration information of an air-conditioning device, and information of an audio device.

A display content of the display device 5 can be setup by a gesture input. The gesture input means an input operation by a gesture. A setting content of various onboard devices such as a navigation device, an air-conditioning device, and an audio device can be set through the gesture input. In an example in FIG. 1, a sensor unit 10 detects a movement of a finger 96 of an operator who rides on the driving seat 2. The display content of the display device 5 is changed according to the detected movement (the gesture) of the finger 96.

A symbol of "90" in FIG. 1 corresponds to a left upper limb of the operator. The upper limb 90 corresponds to a body region from a shoulder to an end of a finger in a body. Thus, the upper limb 90 includes an upper arm 91, a lower arm 93, and a hand 95. The upper arm 91 corresponds to a region from the shoulder to an elbow 92. The lower arm 93 corresponds to a body region from the elbow 92 to a wrist 94. The hand 95 corresponds to a fingertip side from the wrist 94, and in other words, the hand 95 corresponds to a body region from the wrist 94 to the finger 96. The hand 95 includes the finger 96.

Figure 3:
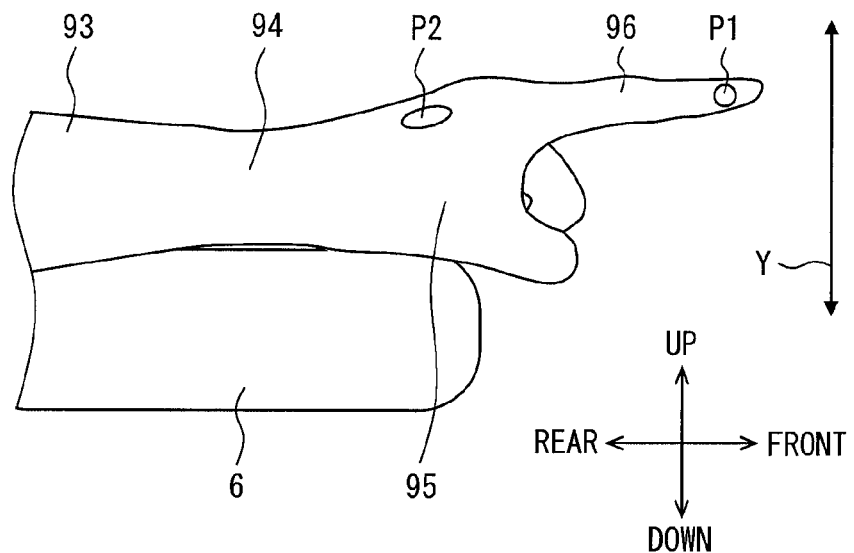
FIG. 3 is a side view illustrating a case where an input is performed with a gesture in which a finger is moved vertically.
Figure 4:
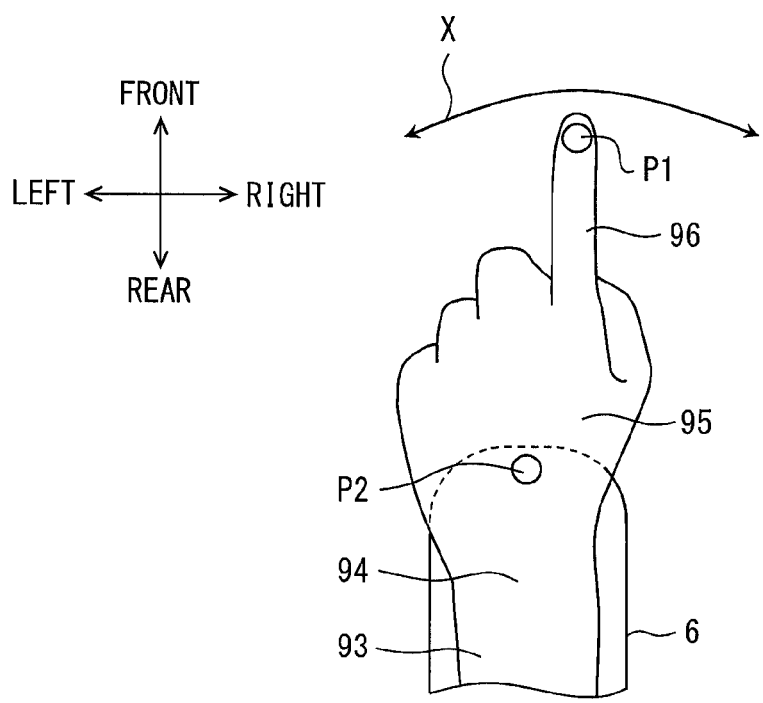
FIG. 4 is a top view illustrating a case where an input is performed with a gesture in which a finger is moved laterally.

The driving seat 2 is mounted with an armrest 6. The armrest 6 supports the left upper limb 90 of the operator from the below. In detail, the armrest 6 is provided to support the lower arm 93 at least. Depending on an operator, the wrist 94 or the hand 95 of the operator may be partially put on the armrest 6 with the upper arm 91, as illustrated in FIG. 3 and FIG. 4. It is supposed that the upper limb 90 is put on the armrest 6 and the gesture input is performed by the finger 96.

Figure 2:
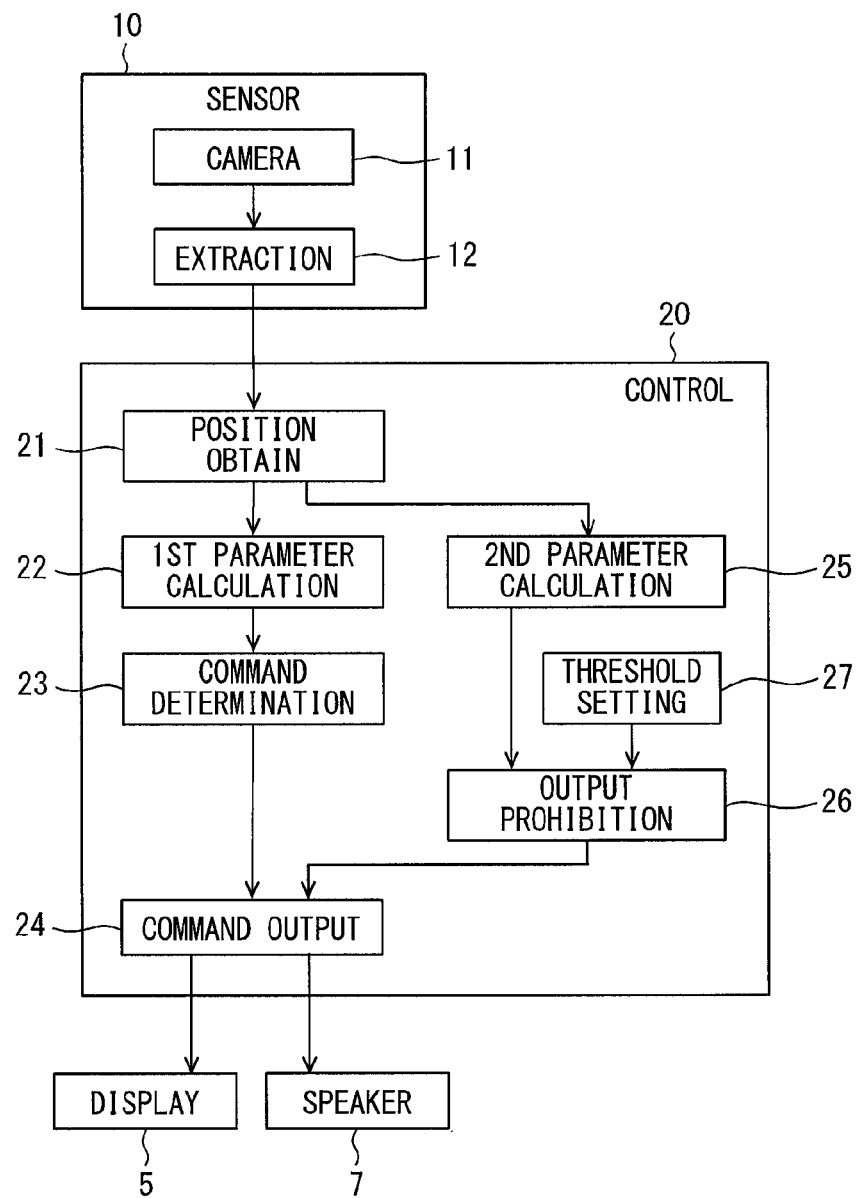
FIG. 2 is a block diagram illustrating the gesture input apparatus according to a first embodiment.

As described in FIG. 2, the sensor unit 10 includes a camera 11 and an extraction portion 12. The camera 11 is provided to the lower part of the hand 95 of the upper limb 90, which is put on the armrest 6. The camera 11 corresponds to a stereo camera having a pair of imaging elements that are separated by a predetermined distance each other. The extraction portion 12 is realized by an operation based on a predetermined program performed by a microcomputer. The extraction portion 12 extracts a first region P1 and a second region P2 from an image of the hand 95, which is captured by the camera 11.

The extraction portion 12 performs an image analysis based on a difference between images captured by the pair of the imaging elements. The extraction portion 12 calculates absolute positions of the first region P1 and the second region P2 in the vehicle compartment. That is, the extraction portion 12 calculates coordinates (spatial positions) of the first region P1 and the second region P2 triaxially in the up-and-down direction, the right-and-left direction, and the front-and-rear direction.

The microcomputer in the sensor unit 10 calculates a spatial position of a tip region of a finger other than the index finger 96. The index finger 96 is set to the first region P1 as an example in the embodiment. It may be possible to recognize a gesture performed by five fingers. In addition to the spatial positions of the tips of the five fingers, a direction of the tips of the five fingers and a direction of the hand 95 are also analyzed. It may be possible to recognize a gesture performed by the hand 95.

As described in FIG. 3 an FIG. 4, in the present embodiment, the first region P1 corresponds to a tip region of the finger 96, more specifically, a tip side from a first joint. The second region P2 corresponds to a body region positioned to a shoulder side from the first region P1. That is, the second region P2 is nearer to the shoulder than the first region P1. The second region P2 is extracted from the image by the image analysis. For example, the second region P2 corresponds to a point separated from the first region P1 toward a center of the wrist 94 by a predetermined length. In this example, the predetermined length is determined in advance, so that the second region P2 exists in a back of the hand 95. Incidentally, FIG. 3 illustrates a case where a gesture that the index finger 96 is moved along the up-and-down direction is performed as described by an arrow Y. FIG. 4 illustrates a case where a gesture that the index finger 96 is moved along the right-and-left direction is performed as described by an arrow X.

As described in FIG. 2, the sensor unit 10 detects the first region P1 and the second region P2. Based on the positions of the first region P1 and the second region P2, a control device 20 determines a type of the gesture, and outputs a command according to the type of the gesture to the display device 5 or a speaker 7. To realize the functions of the control device 20, the control device 20 has the following portions. That is, the control device 20 includes a position obtain portion 21, a first parameter calculation portion 22, a command determination portion 23, a command output portion 24, a second parameter calculation portion 25, an output prohibition portion 26, and a threshold setting portion 27. The second parameter calculation portion 25 corresponds to a speed detection portion. The portions are realized so that a microcomputer in the control device 20 operates based on a predetermined program. The control device 20 corresponds a gesture input apparatus that outputs a command according to a gesture to various onboard devices.

The position obtain portion 21 obtains spatial positions of the first region P1 and the second region P2, which are calculated by the extraction portion 12, from the sensor unit 10. The first parameter calculation portion 22 calculates a track (a movement track) that the first region P1 has moved along and a movement speed VP1 of the first region P1 based on the position information of the first region P1 obtained by the position obtain portion 21. The command determination portion 23 determines a command from among multiple preset commands based on the movement track and the movement speed VP1 of the first region P1, which are calculated by the first parameter calculation portion 22. The command determination portion 23 recognizes a command according to a gesture of the first region P1.

Incidentally, the movement track of the first region P1 calculated by the first parameter calculation portion 22 corresponds to a track obtained by projecting to a plane including the up-and-down direction and the right-and-left direction as described in FIG. 3 and FIG. 4. The command determination portion 23 determines that the track projected to the plane corresponds to either of the preset tracks, and recognizes a command according to the gesture.

The command output portion 24 outputs the command recognized by the command determination portion 23 to the display device 5 and the speaker 7. According to the gesture performed by the operator, the display device 5 and the speaker 7 will be operated. For example, the gesture input apparatus may receive a gesture input and the speaker 7 may operate and output sound at the timing the command is transmitted to the display device 5. Therefore, it may be possible that the operator is notified of a reception of the gesture input. When a gesture input is cancelled, the speaker 7 outputs sound and the operator is notified of a cancellation of the gesture input. According to a type of the received gesture, the speaker 7 may output different sounds.

The second parameter calculation portion 25 calculates a movement track that the second region P2 has moved along and a movement speed VP2 of the second region P2 based on the position information of the second region P2. The position information of the second region P2 is obtained by the position obtain portion 21. The output prohibition portion 26 determines whether the movement speed VP2 of the second region P2 is less than a predetermined speed Vth. While it is determined that the movement speed VP2 is less than the predetermined speed Vth, a prohibition flag is turned ON. The prohibition flag causes to prohibit the output of the command recognized by the command determination portion 23. The command output portion 24 is prohibited to output the command when the output prohibition portion 26 turns the prohibition flag ON. Accordingly, the output of the command is prohibited even when the command according to the movement of the first region P1 is recognized.

The threshold setting portion 27 sets a value of the predetermined speed Vth according to an input operation by the operator. The predetermined speed Vth is used in a determination of the output prohibition portion 26. Therefore, the operator enables to set the predetermined speed Vth, so that the operator enables to adjust a reception sensitivity or a cancellation sensitivity of the gesture input. For example, the threshold setting portion 27 includes a tutorial function. The tutorial function sets the predetermined speed Vth by setting a threshold value of a reception and a cancellation. In the tutorial function the finger 96 is actually moved, for example. The threshold setting portion 27 corresponds to an example of a setting portion that sets the predetermined speed Vth based on a setting input operation by the operator.

Figure 5:
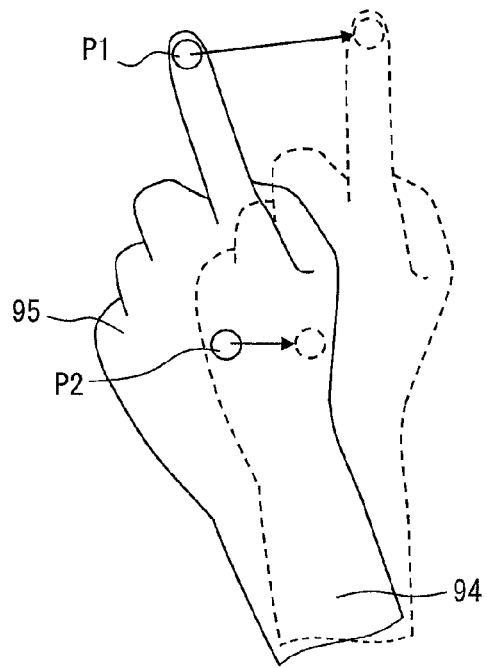
FIG. 5 is a top view illustrating a case where a finger is moved for a purpose of an input.

It is supposed that the gesture input is performed by moving the finger 96 for the input purpose. In this case, it may be likely to put the upper limb 90 on the armrest 6 and move the finger 96. It may be likely to move the first region P1 around a predetermined region as a supporting point. The predetermined region is positioned to a shoulder side as compared with the first region P1 in the upper limb 90. A specific example of the predetermined region to be the supporting point corresponds to the wrist 94, a part of the lower arm 93, an elbow 92, or the like. For example, as in a case where the hand 95 is moved from a solid line position to a dotted line position in FIG. 5, the finger 95 (corresponding to the first region) may be moved around the wrist 94 put on the armrest 6 as the supporting point. FIG. 5 illustrates an example of a gesture input. Alternatively, the hand 95 (corresponding to the first region) may be moved around a part of the lower arm 93 or the elbow 92 put on the arm rest 6 as the supporting point.

Therefore, since the first region P1 is moved around the predetermined region as the supporting point in a case of the input purpose, the predetermined region is moved hardly. Since the second region P2 positioned to the shoulder side from the first region P1 is positioned nearer to the predetermined region (the supporting point) than the first region P1, it may be impossible that the second region P2 moves faster than the first region P1.

Figure 6:
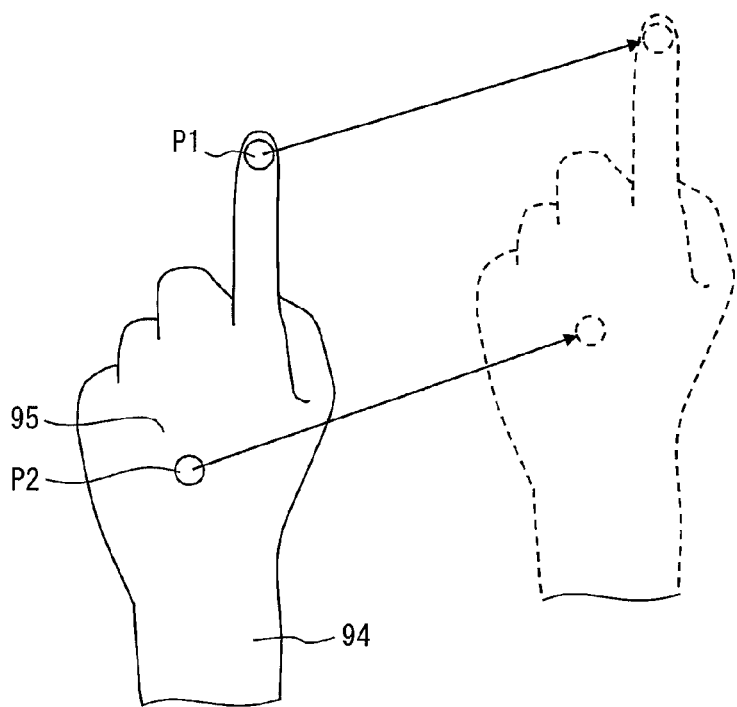
FIG. 6 is a top view illustrating a movement of a finger at the time when an input is not performed.

On the contrary, in a case other than the input purpose, as in a case where the hand 95 is moved from a solid line position to a dotted line position in FIG. 6, it may be likely that the whole upper limb 90 moves together with the first region P1. FIG. 6 corresponds to an example of a prohibition of the command output. Thus, it may be likely that the movement speed of the second region P2 is faster than the movement speed at the time of the input purpose.

Figure 7:
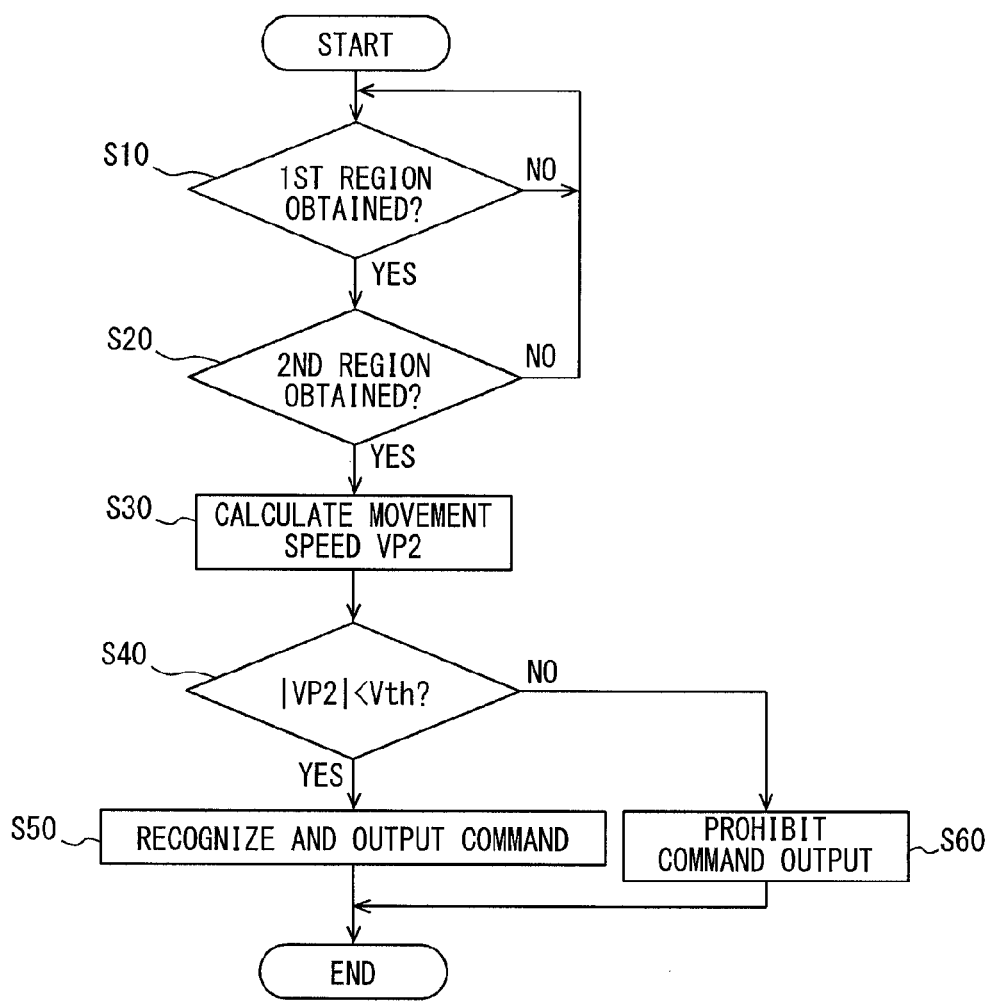
FIG. 7 is a flowchart illustrating a procedure of processing outputting a command according to a gesture by the gesture input apparatus in the first embodiment.

Therefore, the microcomputer in the control device 20 recognizes the gesture input according to a processing in FIG. 7 and outputs the command.

The processing performed by the control device 20 will be explained. At S10, it is determined whether the position obtain portion 21 obtains the spatial position of the first region P1. For example, when the finger 96 does not exist in a detectable area by the sensor unit 10 such as a case where the upper limb 90 is not put on the armrest 6, the position obtain portion 21 does not obtain the spatial position of the first region P1. When it is determined that the position obtain portion 21 has obtained the spatial position of the first region P1, the processing shifts to S20. At S20, it is determined whether the position obtain portion 21 obtains the spatial position of the second region P2. At S20, similar to S10, the spatial position of the second region P2 is not obtained unless the hand 95 exists in the detectable area.

When it is determined that the spatial position of the second region P2 is obtained, the processing shifts to S30. At S30, the second parameter calculation portion 25 calculates the movement speed VP2 and the processing shifts to S40. At S40, the output prohibition portion 26 performs a determination. That is, the output prohibition portion 26 determines whether the movement speed VP2 calculated at S30 is less than the predetermined speed Vth set by the threshold setting portion 27.

When it is determined that the movement speed VP2 is less than the predetermined speed Vth (S40: YES), the processing shifts to S50. At S50, the command determination portion 23 and the command output portion 24 perform the following processing. That is, the command determination portion 23 and the command output portion 24 recognize the command according to the movement track of the first region P1 and output the recognized command to the display device 5 and the speaker 7. When it is determined that the movement speed VP2 is not less than the predetermined speed Vth, the processing shifts to S60. At S60, a command output by the command output portion 24 is prohibited.

According to the present embodiment, the command output according to the gesture of the first region P1 is prohibited when the movement speed of the second region P2 is equal to or more than the predetermined speed Vth. Thus, when the whole upper limb 90 is moved for a purpose other than the input purpose, the movement speed of the second region P2 is equal to or more than the predetermined speed and the output of the command recognized by the gesture is prohibited. On the contrary, when the finger 96 is moved around the wrist 94 put on the armrest 6 as the supporting point and the gesture input is performed, the movement speed of the second region P2 is less than the predetermined speed and the output of the command recognized by the gesture is permitted. Therefore, according to the present embodiment, it may be possible to suppress the output of the command against an intention of the operator.

According to the present embodiment, the control device 20 includes the threshold setting portion 27 that sets the predetermined speed Vth based on the operation by the operator. Therefore, it may be possible to adjust a reception sensitivity of the gesture input to any favorite sensitivity for the operator. The reception sensitivity of the gesture input is determined by the predetermined speed Vth.

Second Embodiment

Figure 8:
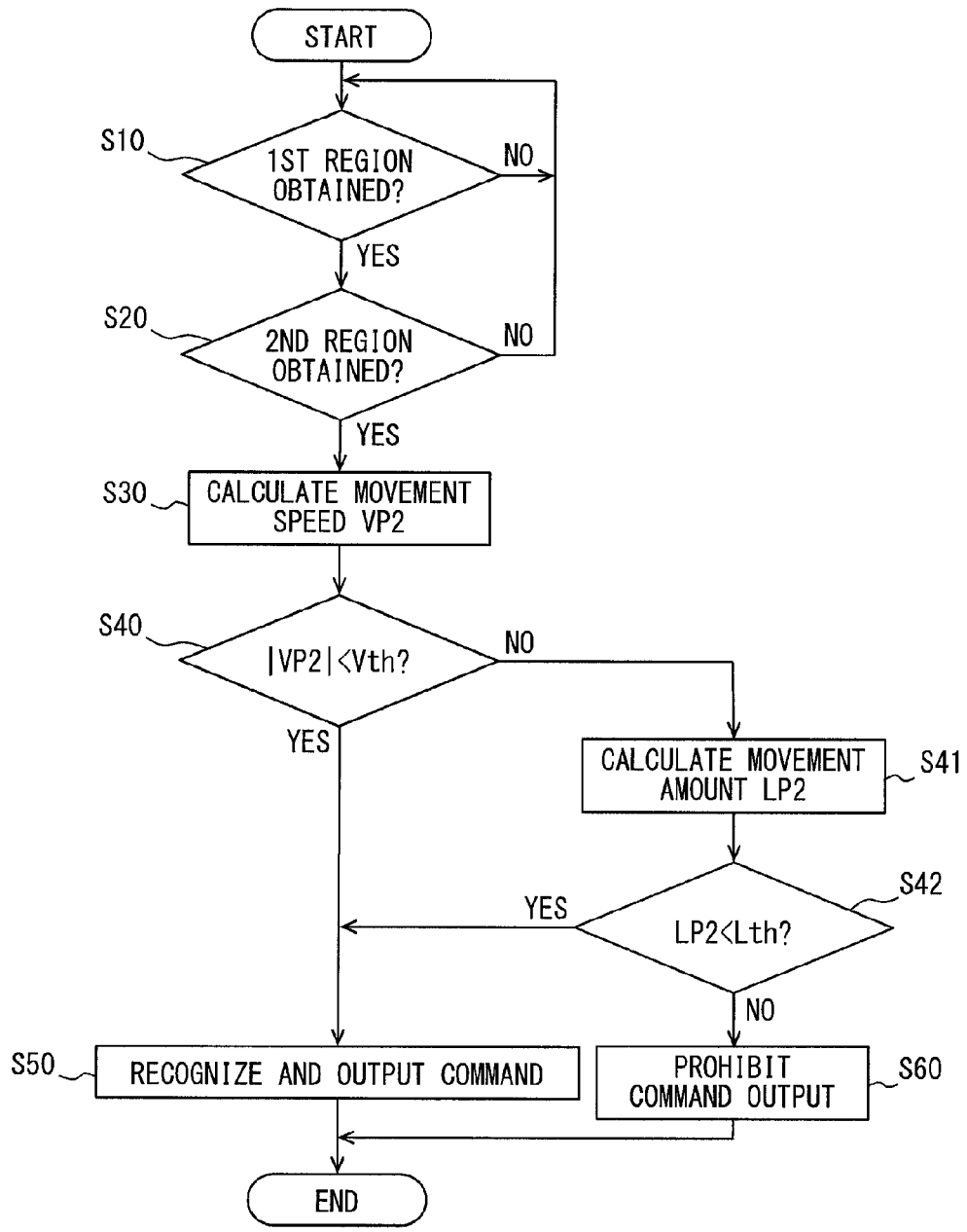
FIG. 8 is a flowchart illustrating a procedure of processing outputting a command according to a gesture by the gesture input apparatus in a second embodiment.

In the second embodiment, S41 and S42 as described in FIG. 8 are added to the processing in FIG. 7 in the first embodiment. Incidentally, a hardware configuration according to the present embodiment is identical with the hardware configuration described in FIG. 2.

At S40 as described in FIG. 8, when it is determined that the movement speed VP2 of the second region P2 is not less than the predetermined speed (S40: NO), the processing shifts to S41. At S41, a movement amount LP2 of the second region P2 is calculated. Specifically, based on the spatial position of the second region P2 obtained at S20, the movement amount LP2 of the second region P2 is calculated. A period that is an object of the calculation corresponds to a period while it is determined that the movement speed VP2 is not less than the predetermined speed. That is, the period of the object of the calculation corresponds to a period while a negative determination is performed. At S41, the movement amount LP2 corresponding to the period that is the object of the calculation is calculated. Incidentally, the control device 20 at the time when the calculation is performed at S41 corresponds to an example of a movement amount detection portion.

At S42, it is determined whether the movement amount LP2 calculated at S41 is less than the predetermined length Lth. When it is determined that the movement amount LP2 is less than the predetermined length Lth, the processing shifts to S50 instead of a prohibition of the command output at S60. At S50, the command output is executed. The control device 20 at the time of executing a determination of S42 corresponds to a first permission portion that cancels the prohibition of the command output and permits the output of the command when the movement amount LP2 is less than the predetermined length Lth. The predetermined length Lth, which is used in the determination of S42, is set and changed to a larger value as the movement speed VP1 of the first region P1 is faster.

According to the present embodiment, the command according to the gesture is output when the movement amount LP2 is less than the predetermined length Lth even when the movement speed VP2 is equal to or more than the predetermined speed Vth. Therefore, it may be possible to prevent the wrong prohibition of the command output. For example, it is supposed that the finger 96 is moved around the predetermined region in the upper limb 90 as the supporting point and a gesture operation is performed. In this case, the predetermined region in the upper limb 90 may move over on the armrest 6 due to a vibration of the vehicle 1. In this case, the movement speed VP2 of the second region P2 may be equal to or more than the predetermined speed Vth. As described in FIG. 6, it may be unlikely that the second region P2 moves largely. Thus, it may be likely that the movement amount LP2 is less than the predetermined length Lth even when the movement speed VP2 is equal to or more than the predetermined speed Vth. Thus, according to the second embodiment in which S41 and S42 are added, since the command output is permitted in the above condition, it may be possible to prevent a case such as a case where the gesture input is not received wrongly.

For example, it is supposed that the gesture operation is performed by moving the finger 96 around the predetermined region in the upper limb 90 as the supporting point. In this case, the supporting point may move more likely as the finger 96 moves faster. In the present embodiment, as the movement speed VP1 of the first region P1 performing the gesture operation moves faster, the predetermined length Lth used in the determination of S42 is set larger. Therefore, when the finger 96 is moved quickly and the movement speed VP2 is equal to or more than the predetermined speed Vth, it may be possible to suppress a case where the gesture input is not received wrongly.

Third Embodiment

Figure 9:
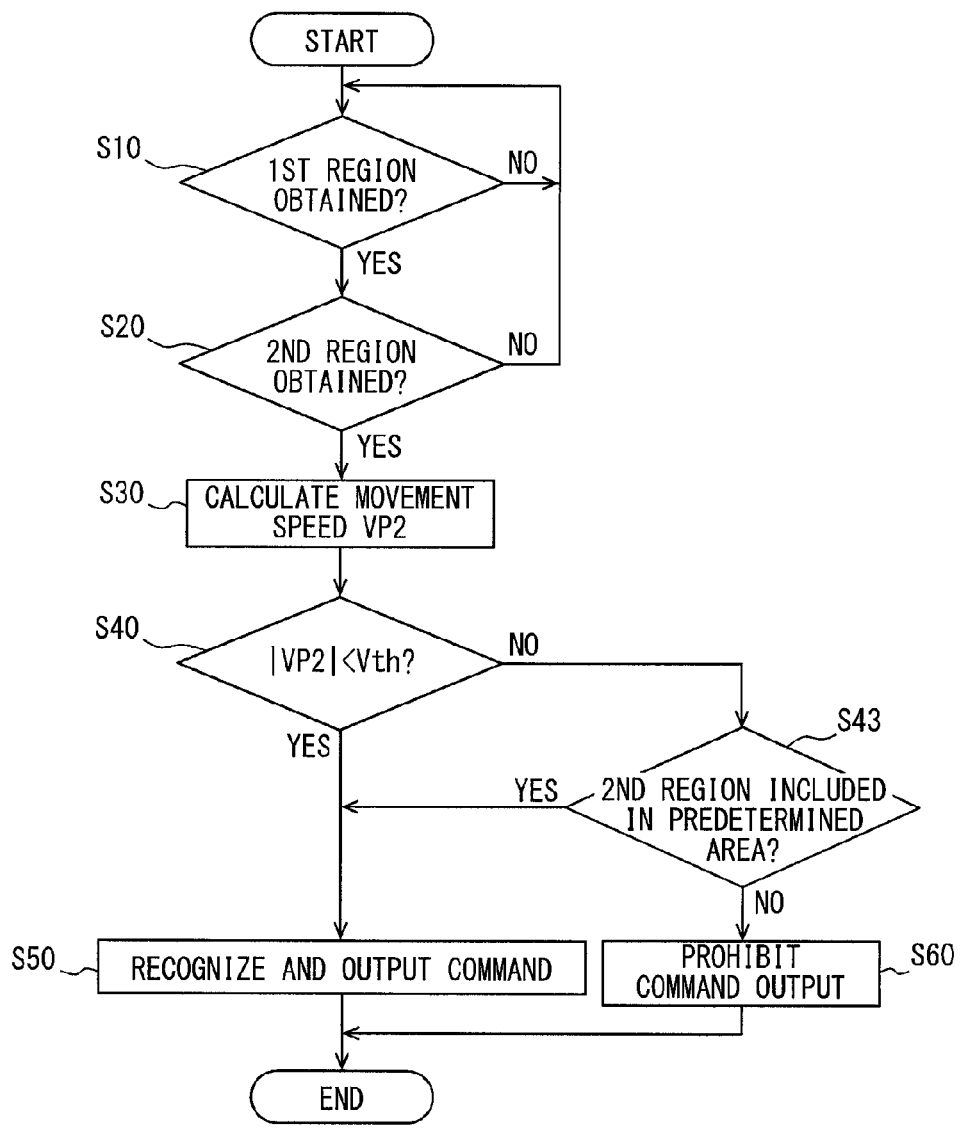
FIG. 9 is a flowchart illustrating a procedure of processing outputting a command according to a gesture by the gesture input apparatus in a third embodiment.

In a third embodiment, S43 as described in FIG. 9 is added to the processing of FIG. 7 in the first embodiment. Incidentally, a hardware configuration according to the present embodiment is identical with the hardware configuration described in FIG. 2.

At S40 described in FIG. 8, when it is determined that the movement speed VP2 of the second region P2 is not less than the predetermined speed Vth (S40: NO), the processing shifts to S43. At S43, it is determined whether the second region P2 is included in a predetermined area. The predetermined area may correspond to an area where the second region P2 exists in a case where a part of the lower arm 93 is put on the armrest 6. Incidentally, the determination at S43 is executed while S40 corresponds to NO, that is, while the movement speed VP2 is not less than the predetermined speed Vth. When it is determined that the second region P2 is positioned in the predetermined area, the processing shifts to S50 and the command output is executed instead of the prohibition of the command output at S60.

The control device 20 at the time of executing a calculation of S43 corresponds to a second permission portion that cancels the prohibition of the command output and permits the command output when the second region P2 is positioned in the predetermined area. The predetermined area used in the determination of S43 is set and changed to a larger area as the movement speed VP1 of the first region P1 is faster.

According the present embodiment, the command according to the gesture is output when the second region P2 is positioned in the predetermined area even when the movement speed VP2 is equal to or more than the predetermined speed Vth. Therefore, it may be possible to prevent the wrong prohibition of the command output. For example, it is supposed that the finger 96 is moved around the predetermined region in the upper limb 90 as the supporting point and the gesture operation is performed. In this case, the predetermined region in the upper limb 90 may move over on the armrest 6 due to, for example, a vibration of the vehicle 1. In this case, the movement speed VP2 of the second region P2 may be equal to or more than the predetermined speed Vth. As described in FIG. 6, it may be unlikely that the second region P2 moves largely. Thus, it may be likely that the second region P2 is positioned in the predetermined area even when the movement speed VP2 is equal to or more than the predetermined speed Vth. Thus, according to the third embodiment in which the processing of S43 is added, since the command output is permitted in the above condition, it may be possible to prevent a case where the gesture input is not received wrongly.

For example, it is supposed that the gesture operation is performed by moving the finger 96 around the predetermined region in the upper limb 90 as the supporting point. In this case, the supporting point may move more likely as the finger 96 moves faster. In the present embodiment, as the movement speed VP1 of the first region P1 performing the gesture operation moves faster, the predetermined area used in the determination of S43 is set larger. Therefore, when the finger 96 is moved quickly and the movement speed VP2 is equal to or more than the predetermined speed Vth, it may be possible to prevent a case where the gesture input is not received wrongly.

Other Embodiments

The present disclosure is not limited to the embodiments. The disclosure may be modified and embodied in a various manners. It should be noted that not only combination that it is clearly and specifically described that a combination is possible in each embodiment, any combination of embodiments may be possible unless there is a difficulty with respect to the combination.

Although the embodiment in FIG. 2 includes the threshold setting portion 27, the threshold setting portion 27 will be omitted. In this case, the predetermined speed Vth used in the determination of S40 may be set to a predetermined value or may be variably set so that the predetermined speed Vth becomes larger as the movement speed VP1 of the first region P1 becomes faster. An effect by the variable setting will be explained.

For example, it is supposed that the gesture operation is performed by moving the finger 96 around the predetermined region in the upper limb 90 as the supporting point. In this case, the supporting point may move more likely as the finger 96 moves faster. Thus, it may be likely that the movement speed VP2 is equal to or more than the predetermined speed Vth irrespective of the gesture operation. In this case, the variable setting may be performed, for example. Even when the finger 96 moves quickly and the movement speed VP2 is equal to or more than the predetermined speed Vth, it may be possible to prevent a case where the gesture input is not received.

The processing of S40 in FIG. 7, FIG. 8 and FIG. 9 determines whether the movement speed VP2 of the second region P2 is less than the predetermined speed Vth. Alternatively, at S40, it may be determined whether a status that the movement speed VP2 is less than the predetermined speed Vth has continued for a predetermined period or more. In this case, the processing shifts to S60 and the command output is prohibited even when the movement speed VP2 is less than the predetermined speed Vth unless the status that the movement speed VP2 is less than the predetermined speed Vth has continued for the predetermined period or more. In this case, the predetermined period may be set to different values depending on the gesture content. For example, a gesture that the finger 96 is moved to a downward direction may be easier than a gesture that the finger 96 is moved toward an upper direction. Thus, the predetermined period of the gesture that the finger 96 is moved to the downward direction may be shorter than the predetermined period of the gesture that the finger 96 is moved toward the upper direction.

In the example in FIG. 3, the first region P1 corresponds to the finger 96. The input operation is performed by a gesture of the finger 96. Alternatively, the first region may correspond to a part of the upper limb 90 other than the finger 96. For example, the first region may correspond to a palm or a fist. In the example in FIG. 3, the second region P2 corresponds to the back of the hand 95. Alternatively, the second region may correspond to a part of the upper limb 90 other than the back of the hand 95. For example, the second region may correspond to the wrist 94, a part of the lower arm 93, or the elbow 92.

In the embodiment described in FIG. 2, the sensor unit 10 extracts the first region P1 and the second region P2 from the image of the hand 95 captured by the camera 11. Alternatively, the control device 20 may extract the first region and the second region P2 from the image of the hand 95.

The second embodiment and the third embodiment may be combined. That is, when it is determined that the movement amount LP2 is not less than the predetermined length Lth at S42 described in FIG. 8, the determination of S43 in FIG. 9 may be performed. And, when it is determined that the second region P2 is positioned in the predetermined area, the processing shifts to S50 and the command may be output. When it is determined that the second region P2 is not included in the predetermined area, the processing shifts to S60 and the command output may be prohibited.

According to one aspect of the present disclosure, a gesture input apparatus is provided. The gesture input apparatus includes a command determination portion, a command output portion, a speed detection portion, and an output prohibition portion. The command determination portion is provided in a vehicle and determines a command according to a gesture of a first region of an upper limb of an operator who rides on the vehicle. The command output portion outputs the command determined by the command determination portion. The speed detection portion detects a movement speed of a second region that is positioned nearer to a shoulder than a first region in the upper limb. The output prohibition portion prohibits an output of the command by the command output portion when the movement speed detected by the speed detection portion is equal to or more than a predetermined speed.\

According to the gesture input apparatus in the embodiments, when the upper limb is moved and the gesture input is performed for an input purpose, the first region (for example, a finger) in the upper limb is moved according to a command that the operator wants to input. When the gesture input is performed, it may be likely that the first region is moved around a predetermined region that is positioned close to the shoulder than the first region of the upper limb as the supporting point. For example, a finger (corresponding to the first region) may be moved around a wrist (corresponding to the predetermined region) as the supporting point, or a hand (corresponding to the first region) may be moved around a part (corresponding to the predetermined region) of the lower arm as the supporting point.

Therefore, since the first region is moved around the predetermined region as the supporting point in a case of the input purpose, the predetermined region may move hardly and the second region that is positioned nearer to the shoulder than the first region may not move faster than the first region. Since it may be likely that the whole upper limb moves with the first region in a case other than the input purpose, the movement speed of the second region may be faster than the movement speed of the second region at the time of the input purpose.

Thus, according to the gesture input apparatus, when the movement speed of the second region is equal to or more than a predetermined speed, an output of the command according to the gesture of the first region is prohibited. Thus, when the whole upper limb moves with the first region in a case other than the input purpose, the movement speed of the second region is equal to or more than the predetermined speed and the command output is prohibited. When the first region is moved around the predetermined region as the supporting point for performing the gesture input, the movement speed of the second region is less than the predetermined speed, and the command according to the gesture is output. Therefore, according to the gesture input apparatus, it may be possible to prevent the command output against an intention of an operator.

It is noted that a flowchart or a processing of the flowchart in the present application includes steps (also referred to as sections), each of which is represented, for example, as S10. Further, each step may be divided into several sub-steps, and several steps may be combined into a single step.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A gesture input apparatus comprising:
a controller having a processor therein, the processor is configured to
determine, in a vehicle, a command according to a gesture of a first region in an upper limb of an operator who rides in the vehicle;
output the command determined;
detect a movement speed of a second region in the upper limb, the second region being in the upper limb nearer to a shoulder of the operator than the first region in the upper limb; and
prohibit an output of the command when the movement speed detected is equal to or more than a predetermined speed.

2. The gesture input apparatus according to claim 1, wherein the processor is further configured to
detect a movement amount of the second region while the movement speed of the second region is equal to or more than the predetermined speed; and
cancel a prohibition and permit the output of the command when the movement amount detected is less than a predetermined amount.

3. The gesture input apparatus according to claim 2, wherein
the predetermined amount is larger as movement speed of the first region is faster.

4. The gesture input apparatus according to claim 1, wherein the processor is further configured to
cancel a prohibition and permit the output of the command when the second region is positioned within a predetermined area while the movement speed of the second region is equal to or more than the predetermined speed.

5. The gesture input apparatus according to claim 4, wherein
the predetermined area is larger as movement speed of the first region is faster.

6. The gesture input apparatus according to claim 1, wherein
the predetermined speed is greater as movement speed of the first region is faster.

7. The gesture input apparatus according to claim 1, wherein the processor is further configured to
set the predetermined speed based on a setting input operation by the operator.

8. The gesture input apparatus according to claim 3, wherein the processor is further configured to
calculate the movement speed of the first region; and
cancel a prohibition and permit the output of the command when the second region is positioned within a predetermined area while the movement speed of the second region is equal to or more than the predetermined speed, wherein
the predetermined area is larger as the movement speed of the first region is faster.

9. A gesture input apparatus comprising:
a command determination portion provided to a vehicle and determining a command according to a gesture of a first region in an upper limb of an operator who rides in the vehicle;
a command output portion outputting the command determined by the command determination portion;
a speed detection portion detecting a movement speed of a second region that is positioned nearer to a shoulder of the operator than the first region in the upper limb;
an output prohibition portion prohibiting an output of the command by the command output portion when the movement speed detected by the speed detection portion is equal to or more than a predetermined speed; and
one or both of (i) and (ii):
(i) a movement amount detection portion detecting movement amount of the second region while the movement speed of the second region is equal to or more than the predetermined speed; and a first permission portion cancelling a prohibition by the output prohibition portion and permitting the output of the command when the movement amount detected by the movement amount detection portion is less than a predetermined amount; and
(ii) a second permission portion canceling the prohibition by the output prohibition portion and permitting the output of the command when the second region is positioned within a predetermined area while the movement speed of the second region is equal to or more than the predetermined speed.

10. The gesture input apparatus according to claim 9, wherein
the predetermined amount is larger as movement speed of the first region is faster.

11. The gesture input apparatus according to claim 9, wherein
the predetermined area is larger as movement speed of the first region is faster.

12. The gesture input apparatus according to claim 9, wherein
the predetermined speed is greater as movement speed of the first region is faster.

13. The gesture input apparatus according to claim 9, further comprising
a threshold setting portion setting the predetermined speed based on a setting input operation by the operator.

14. The gesture input apparatus according to claim 9, further comprising:
a first parameter calculation portion calculating the movement speed of the first region, wherein
the predetermined area is larger as the movement speed of the first region is faster.

15. The gesture input apparatus according to claim 1, wherein
the first region is a hand or portion of the hand of the operator,
the second region in the upper limb is a part of a wrist more proximal to the shoulder of the operator than the first region, or the second region in the upper limb is a part of the upper limb more proximal to the shoulder of the operator than the first region, and the first region is spaced apart from the second region and separated therefrom.

16. The gesture input apparatus according to claim 1, wherein
the first region is a first point on a hand, a finger, or a wrist of the upper limb of the operator,
the second region is a second point on an upper arm, a lower arm, or a wrist of the upper limb of the operator,
the second point is more proximal to the shoulder of the operator than the first point, and the first point is spaced apart from the second point and separated therefrom by a predetermined length.

* * * * *